United States Patent

Deschamps

[15] 3,643,734

[45] Feb. 22, 1972

[54] ANISOTROPIC HEAT VALVE

[72] Inventor: Nicholas H. Deschamps, Ferry, N.H.

[73] Assignee: Sanders Nuclear Corporation, Nashua, N.H.

[22] Filed: June 17, 1968

[21] Appl. No.: 737,753

[52] U.S. Cl. ....................165/96, 165/146
[51] Int. Cl. ....................F28f 27/00
[58] Field of Search ....................165/30, 1, 146, 96, 32

[56] References Cited

UNITED STATES PATENTS

| | | | |
|---|---|---|---|
| 3,021,688 | 2/1962 | Winfield, Jr. | 165/30 |
| 3,331,432 | 7/1967 | Cotton | 165/146 |

*Primary Examiner*—Charles Sukalo
*Attorney*—Louis Etlinger

[57] ABSTRACT

An anisotropic heat valve is provided for use between a heat source and a heat user to regulate flow of heat from the source to the user. A housing overlies an anisotropic member and means are provided for pivoting the anisotropic member to change the thermal conductivity through the member in one direction and thus provide regulation of heat flow through the valve. The valve is particularly useful in conjunction with radioactive isotopic thermal power sources.

12 Claims, 6 Drawing Figures

INVENTOR.
NICHOLAS H. DESCHAMPS
BY Richard S. Seligman
ATTORNEY

ANISOTROPIC HEAT VALVE

BACKGROUND OF THE INVENTION

Radioactive isotopic thermal power sources are often used for powering thermoelectric and thermionic devices such as thermoelectric generators and the like. Such devices are used in various space applications to convert thermal power to electrical power. In order to provide required heat for a thermoelectric device at the end of any given lifetime, it is often necessary that an isotopic fuel source have a high thermal power rating at the beginning of life above that needed by the device to supply a specific electrical output at the beginning of life. For example, a thermoelectric device requiring 100 thermal watts to provide 5 watts electrical, requires 100 thermal watts throughout the life of the unit. If an isotopic heat source has a half life of 1 year and the measured length of the device is 1 year, then the fuel source will have to be 200 thermal watts at the beginning of life.

Problems arise since it is often preferred to have a constant electrical power output from the thermoelectric device. But it is often necessary, particularly with short half life isotopes, to use with the devices a thermal power source which has a varying thermal output. Moreover, in some cases, the required thermal output at the beginning of life of an isotopic thermal power source could be high enough to damage the thermoelectric or thermionic device with which it is used and provisions must be made to prevent such damage, which provisions may include dumping of excess heat.

Various power flattening solutions have been suggested to monitor the amount of thermal power or heat passage from a radioactive isotopic thermal power source to a user such as a thermoelectric or thermionic device. One such attempt involves the use of louvered doors which open and close to regulate heat flow. Several mechanical problems often occur when such power flattening devices are used.

In still other applications, the thermal source need not be radioactive nor need it be a variable power output source. For example, in certain uses a heat source of constant value is employed in conjunction with a user device where it is desirable to regulate the flow of heat as by substantially cutting off the heat flow to the user during certain time periods.

SUMMARY OF THE INVENTION

A heat valve is provided for use between a thermal source and a heat user to regulate flow of heat from the source to the user in one direction. The valve has a housing substantially enclosing an anisotropic member mounted within the housing. Means are provided for pivoting the member to change the rate of heat flow through the member and thus permit regulation of heat flow between the source and heat user.

Preferable the anisotropic member is pyrolytic graphite in the form of a cylinder, the outer surface of which directly contacts the inner surface of the housing at least on two opposed sides. Rotation of the cylinder about its axis effectively changes the thermal conductivity of the valve in one direction from one side to the other by a factor of at least 100.

The heat valve of this invention has few parts and can be easily fabricated from inexpensive materials. Positive heat regulation can be provided in a wide number of applications.

BRIEF DESCRIPTION OF THE DRAWINGS

The above and other features and advantages of the present invention will be better understood from the following specification when read in conjunction with the accompanying drawings in which.

DESCRIPTION OF PREFERRED EMBODIMENTS

Figure 1:
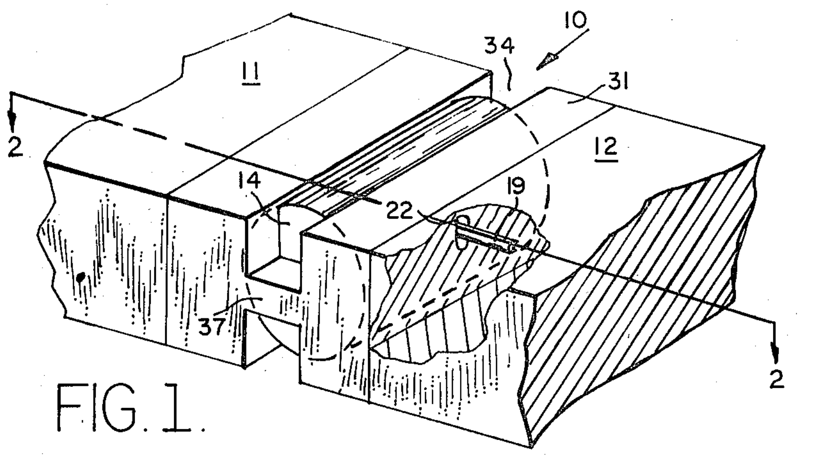
FIG. 1 is a perspective view of a preferred embodiment of the heat valve of this invention with associated devices semidiagrammatically illustrated.

With reference now to the drawings and more particularly FIG. 1, an anisotropic heat valve 10 is illustrated associated with a thermal source 11 and a heat user 12. The heat valve 10 has a housing 31 substantially enclosing a carbon cylinder 14 with a linkage means 16, 18, and 19 for actuating the cylinder.

The valve 10 has an inner core of a pyrolytic graphite cylinder 14 fixed to a metallic shaft 15 lying on the axis of the cylinder. Pyrolytic graphite is anisotropic in that there is a variation with respect to heat conductivity in different directions in the body of the graphite. The specific material of the cylinder can vary so long as the material has anisotropic properties with respect to heat conductivity preferably so that there is a change in effective thermal conductivity by a factor of at least 100 between one direction and a second direction in the cylinder.

Figure 3:
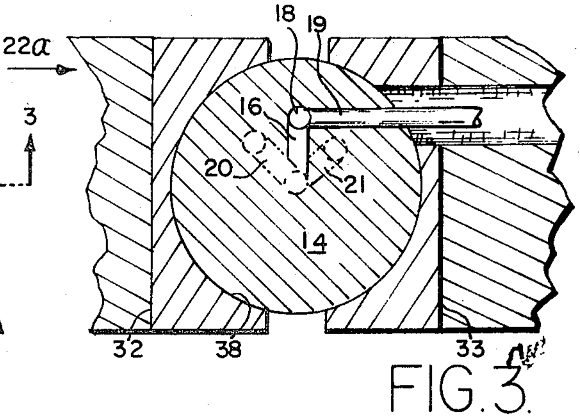
FIG. 3 is a cross sectional view thereof taken through line 3—3 of FIG. 2.

The shaft 15 is fixed to one end of a crank arm 16. The crank arm 16 is in turn pivotally connected by a pivot pin 18 to an actuating rod 19 passing out of the housing through an aperture 22. By moving the actuating rod 19 to the left as shown in FIG. 3, to the position shown in dotted outline 20, maximum heat transfer is permitted in the direction of arrow **22*a* through the cylinder 14. Conversely when the actuating rod 19 is moved to the right into the position shown in dotted outline at 21 in FIG. 3, minimum heat conductivity is permitted in the direction of arrow 22*a* through the cylinder. Positions 20 and 21 are 90° apart when pyrolytic graphite is used in cylinder form in the preferred embodiment. When pyrolytic graphite is used, the cylinder in the position shown at 20 has a thermal heat conductivity of 100 B.t.u. per hr. ft. °F. and in the position shown at 21 has a thermal conductivity of 0.5 B.t.u. per hr. ft. °F. Thus, heat flow in the direction of arrow 22*a* from surface 32 to surface 33 can be substantially controlled at these values by selected actuation of the actuating rod 19**.

The cylinder 14 is mounted for rotation on the axis of shaft 15 in bearings 30 provided in the housing 31.

Housing 31 of the preferred embodiment, preferably has a generally cubic outer configuration defining a first side 32 and a second side 33. Groove 34 extends substantially entirely about the housing which is preferably divided into two identical parts 35 and 36 bonded together at bridges 37 in the front shown in FIG. 1 and the rear, not shown. Bridges 37 divide the groove 34 into two discontinuous portions. As best seen in FIG. 3, the inside of the housing 31 defines a cylindrical chamber in which the graphite cylinder is snugly received so that sliding contact is maintained between the inside surface 38 of the housing and the outside surface of the cylinder 14.

The material of the housing is preferably resistant to deterioration at high temperatures and preferably has good thermal conductivity with metals such as stainless steel, copper, nickel, silver, brass, being preferred for use. Thus, the housing permits good thermal conductivity between surface 32 and the adjacent portion of the cylinder as well as good conductivity between surface 33 and the adjacent portion of the cylinder. However, groove 34 substantially cuts down the heat flow path directly through the walls of the housing going from side 32 to side 33 so that substantially all heat flow through the heat valve passes through the cylinder 14 and sides 32 and 33 are effectively insulated from each other.

In the system shown in FIG. 1, the thermal source 11 is a thermal power source such as a radioactive isotopic power source of thulium 170 having a power rating of at least 0.5 watts per cubic centimeter although higher and lower thermal power sources can be used. While the thermal power source may have varying heat output with time as when radioisotopic power sources are used, the heat valve of this invention is also useful with constant thermal or heat output sources such as electrical heaters or other constant heat source devices.

The user 12 can be a thermoelectric or thermionic device such as a thermoelectric generator. Any heat user can be employed including cooking devices, heat pump devices, motors and the like. In some cases, the heat user can be a heat sink such as a finned radiator to act in power flattening by varying heat output from a radioisotopic varying power source to the atmosphere.

The actuating linkage for actuating operating rod 19 can be a bimetallic strip contacting user 12 which automatically actuates the operating rod 19 to rotate the cylinder 14 from its high to its low conductivity position. Thus, when the portion of the user 12 contacted by the bimetallic strip requires heat, the bimetallic strip positions the rod 19 and cylinder 14 to provide maximum heat conductivity through the valve. Conversely when the user is heated to a predetermined value, the bimetallic strip positions the operating rod to provide minimum heat transfer through the valve. Other types of actuating linkages may be used including time mechanisms for providing high or low conductivity through the valve as a function of a predetermined time interval. In some cases, the operating rod 19 can be actuated manually.

In a specific embodiment of this invention, cylinder 14 is composed of pyrolytic graphite having a heat conductivity in a horizontal plane in the direction of arrow 22*a* shown in FIG. 3, of 100 B.t.u./hr. ft. °F. when the arm 16 is in position 20 and a thermal conductivity of 0.5 B.t.u./hr. ft. °F. in a horizontal plane when the arm 16 is in position 21. The cylinder 14 has a diameter of 1.0 inch and a length of 1.0 inch. Housing 31 is substantially a cube having dimensions of 1.33 inches high, 1.2 inches wide and 1.06 inches long. Groove 34 extends about the entire perimeter of the cube except for linkage portions 37 and is cut away to expose the underlying cylinder with the groove having a width of one-tenth inch. The inside of the housing 14 is provided with a cylindrical chamber in sliding contact with the cylinder. Shaft 15 is composed of stainless steel metal and has a diameter of 0.050 inch.

A 900° F. lithium hydride heat source 11 having 1.0 square inch of surface to surface contact with surface 32 is employed. The heat user 12 is a steam generator having 1.0 square inch of surface to surface contact with surface 33. The linkage mechanism 13 is connected to a bimetallic strip which serves as the feedback transducer. Heat transfer to the steam generator can be varied as a function of the temperature of the steam generator.

Figure 2:
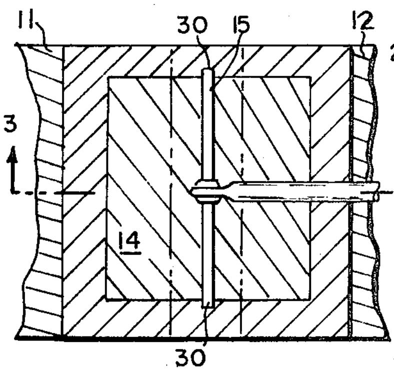
FIG. 2 is a cross sectional view taken thereof taken through line 2—2 of FIG. 1.
Figure 5:
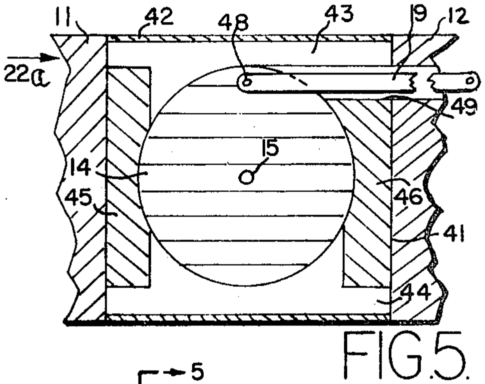
FIG. 5 is a cross-sectional view through line 5—5 of FIG. 4.
Figure 6:
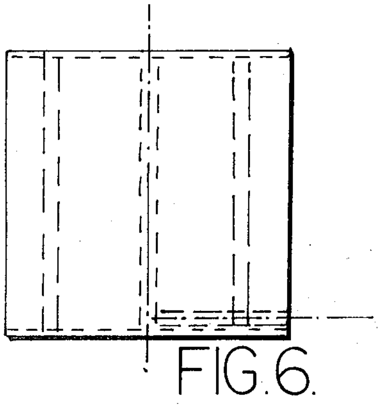
FIG. 6 is a top plan view thereof.
Figure 4:
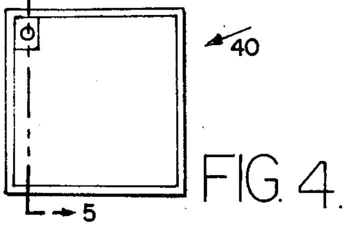
FIG. 4 is a side view of an alternate embodiment of the valve of this invention.

In an alternate embodiment of the present invention, as best shown in FIGS. 4–6, an anisotropic heat valve 40 is shown and is basically similar to the valve 10 illustrated in FIGS. 1–3. In this embodiment of the invention, parts identical with corresponding parts of the heat valve 10 are indicated by identical numerals.

The main difference in valve 40 is the use of a housing 41 different than the housing of the valve 10. Housing 41 comprises a thin metal rectangular cross section retainer shell 42 holding insulating members 43 and 44 in position about the anisotropic cylinder 14 of pyrolytic graphite. The insulating members 43 and 44 can be made of any good insulating material having extremely low thermal conductivity such as Min-K, a silicon-asbestos insulator produced by Johns-Manville Company. Super insulators known in the art can be used for the members 43 and 44. Recesses are provided in the insulators 43 and 44 for mounting of high thermal conductivity metal inserts 45 and 46 on opposing sides of the cylinder as best seen in FIG. 5. The cylinder is mounted on shaft 15 provided with suitable bearings in the retainer 42.

Preferably the retainer 42 is made of a material highly resistant to degradation at high temperatures and may comprise stainless steel.

The activating rod 19 is connected by means of a pin 48 directly to one side of the cylinder and passes through an opening 49 provided in the insert 46 to permit rotation of the cylinder about its shaft 15 at its axis.

The anisotropic cylinder is rotated through 90° to increase or decrease thermal conductance as previously described with regard to the valve 10.

The specific high thermal conductivity metal inserts used can vary depending upon the particular application although copper inserts are preferred for use.

The inner chamber of the housing is defined by the insulating members 43, 44 and the inserts 45 and 46 all of which are suitably designed to provide for close contact with the cylinder 14 over the cylindrical periphery of the cylinder.

In this embodiment, the air gap is eliminated and effectively replaced by an insulating member to thereby decrease thermal conductivity paths in the housing from one side to the other.

While specific embodiments of this invention have been shown and described, it should be understood that many variations thereof are possible. For example, the particular means for rotating the cylinder 14 can vary considerably. In some cases, the actuating means for pivoting the cylinder can be located to the side of the housing rather than passing through the center of the cylinder or lying within the housing. Although it is preferred to use the anisotropic member in cylindrical form, conical, frustoconical or other shapes can be used. While it is preferred that the cylinder 14 rotate or pivot with respect to the housing, in some cases, the entire housing can rotate with the cylinder. In some cases, the material of the housing can be entirely of a low heat conductive material such as alumina, magnesia or other inorganic oxide. In such cases, portions of the walls of the housing contacting the thermal source and heat user are cut out and relatively high heat conductive metals as previously described are inserted to fill the cutouts thereby providing a high heat conductive path through the valve between the thermal source and the heat user similar to the embodiment of FIGS. 4–6.

While it is preferred to use pyrolytic graphite as the anisotropic member, other pyrolytic materials such as pyrolytic boron, pyrolytic nickel, pyrolytic silicon and the like can be used.

In view of the many modifications possible, this invention is to be limited only by the spirit and scope of the appended claims.

What is claimed is:

1. A heat valve for use in interconnecting a thermal source and a heat user to regulate flow of heat from said source to said user, said valve comprising, a housing, a homogenous anisotropic member selected from the group consisting of pyrolytic carbon, pyrolytic boron, pyrolytic nickel and pyrolytic silicon, associated with said housing and having heat conductivity in one direction higher than heat conductivity in a second direction, said anisotropic member having an outer surface in direct sliding contact with an inner surface of said housing at least at two opposing side surfaces thereof, the thermal conductivity of said housing being lower in value than the maximum thermal conductivity of said anisotropic member, and means for pivoting said member with respect to said one direction to change the rate of heat flow through said member in said one direction.

2. A heat valve in accordance with claim 1 wherein said member is pivoted with respect to said housing to regulate heat flow from one side of said housing to an opposing side of said housing.

3. A heat valve in accordance with claim 1 wherein one of said two opposing side surfaces is operatively associated with a thermal source and the second of said two opposing side surfaces is operatively associated with a heat user.

4. A heat valve in accordance with claim 3 wherein said thermal source is a radioisotopic power source having a power rating of at least 0.5 watts per cubic centimeter.

5. A heat valve in accordance with claim 3 wherein said housing defines two opposing surfaces having negligible thermal conductivity from one surface to the other.

6. A heat valve in accordance with claim 1 wherein said anisotropic member is in the form of a cylinder mounted for rotation about its axis in said housing.

7. A heat valve in accordance with claim 6 wherein said housing comprises walls formed of a metal and a heat insulating means is positioned in said walls to block a heat path through said walls between said opposing side surfaces.

8. A heat valve in accordance with claim 7 wherein a pivotal crank arm is mounted on a shaft positioned on said axis.

9. A heat valve in accordance with claim 7 wherein said heat insulating means comprises an air gap defined by said housing.

10. A heat valve in accordance with claim 7 wherein said heat insulating means comprises a low thermal conductivity material and said opposing side surfaces are formed by high thermal conductivity metal members.

11. A heat valve in accordance with claim 2 wherein said anisotropic member is in the form of a cylinder, said cylinder being mounted for rotation on a shaft, said means for pivoting said member comprising an actuating rod.

12. A heat valve in accordance with claim 1 wherein said housing defines opposed high thermal conductivity metal surfaces supported by heat insulating means.

* * * * *